United States Patent
Lee et al.

(10) Patent No.: US 6,977,878 B2
(45) Date of Patent: Dec. 20, 2005

(54) METHOD OF ADJUSTING ROTATION SPEED OF OPTICAL DISC DRIVE

(75) Inventors: Yi-Chung Lee, Hsinchu (TW); Chen-Jung Hsu, Taipei (TW)

(73) Assignee: Lite-On It Corporation, Taipei (TW)

( * ) Notice: Subject to any disclaimer, the term of this patent is extended or adjusted under 35 U.S.C. 154(b) by 343 days.

(21) Appl. No.: 10/430,957

(22) Filed: May 5, 2003

(65) Prior Publication Data

US 2004/0141440 A1     Jul. 22, 2004

(30) Foreign Application Priority Data

Jan. 21, 2003  (TW) ............................... 92101277 A

(51) Int. Cl.⁷ ............................................... G11B 5/09
(52) U.S. Cl. ............................. 369/47.38; 369/47.36; 369/47.39
(58) Field of Search ..................................... 369/47.39

(56) References Cited

U.S. PATENT DOCUMENTS

| | | | |
|---|---|---|---|
| 5,239,533 A * | 8/1993 | Yoshimaru et al. | 369/275.1 |
| 6,292,452 B1 * | 9/2001 | Endo et al. | 720/638 |
| 6,529,456 B2 * | 3/2003 | Koudo et al. | 369/47.48 |
| 6,762,983 B1 * | 7/2004 | Andoh | 369/47.4 |

* cited by examiner

Primary Examiner—David Hudspeth
Assistant Examiner—Adam R. Giesy
(74) Attorney, Agent, or Firm—Thomas, Kayden, Horstemeyer & Risley

(57) ABSTRACT

The present invention discloses a method of adjusting a rotation speed of an optical disc drive for a spindle motor controlled by a host to rotate and read an optical disc. First, it is determined whether the data read by the optical disc drive is in Mode 1 or Form 1 of Mode 2. If in Mode 1 or Form 1 of Mode 2, it is determined whether the frequency of read request commands output from the host is lower than a predetermined value or not. If the frequency of read request commands output from the host is lower than the predetermined value, then it is determined whether the response data output to the host is sequential reading data or not. If the three situations mentioned above are all sustained, the data read by the optical disc drive is ascertained as MP3 data. Thus, the rotation speed of the spindle motor is decreased to a lower value. If one of the three situations is not sustained, the optical disc drive rotates at its highest speed to enhance the quantity of data read between the optical disc drive and the host. Thus, the rotation speed of the optical disc drive is adjusted automatically in response to the data transmission rate.

7 Claims, 1 Drawing Sheet

METHOD OF ADJUSTING ROTATION SPEED OF OPTICAL DISC DRIVE

BACKGROUND OF THE INVENTION

1. Field of the Invention

The present invention relates in general to a method of adjusting the rotation speed of an optical disc drive. In particular, the present invention relates to a method of automatically decreasing rotation speed of the spindle motor in response to the data transmission rate when the read data is MP3 data.

2. Description of the Related Art

With the advances in the operational speed of personal computers, the transmission rate and capacity of peripheral units has also improved. Thus, the function of various storage media of the computer has progressed from simple data storage, to numerous other purposes. Using a CD-ROM optical disc drive as an example, the recorded content in the optical disc may be audio video or standard data. There are many types of data format that can be recorded on the optical disk.

CD-DA: CD-DA(Compact Disc Digital Audio) is the standard format for music CDs. All CD optical discs conforming to the CD-DA standard can be played by CD audio player.

Mode 1: Each sector comprises error correction code (ECC) with a size of 2048 bytes. ECC can fix the reading error of data when data is read from the optical disc to increase the accuracy of data writing. The data structure in Mode 1 is employed when errors are not allowed in the stored data, for example, software, games, and archived data.

Mode 2:Mode 2 comprises the two forms described below.

Form 1: Form 1 uses error detection code (EDC) and error correction code (ECC) to encode data. Thus, data is encoded with high accuracy by Form 1 of Mode 2.

Form 2: Form 2 uses no error detection code (EDC) or error correction code (ECC) to process the data to be written. Thus, the accuracy of the data in Form 2 of Mode 2 is lower than in Model or Form 1 of Mode 1. For example, VCD data is encoded in Form 2 of Mode 2.

However, the transmission rate between the host and optical disc drive mostly depends on the time expended by the optical disc drive in reading the optical disc. Thus, there is a trend to increase the data reading rate of the optical disc drive. The conventional method improves the data reading rate by setting the spindle motor of the optical disc to rotate at the highest speed when reading data. However, the conventional optical disc drive still uses the highest speed to play MP3 data because does not recognize the read data as MP3 data. Thus, the spindle motor operating at high speed consumes excessive power. In addition, high speed operation of the optical disc results in noise, vibration, and poor reading performance and causes the performance of the conventional optical disc drive to deteriorate.

SUMMARY OF THE INVENTION

The object of the present invention is thus to provide a method of adjusting the rotation speed of the optical disc drive to an appropriate speed according to the data type recorded on the optical disc, to meet data transmission requests and to ameliorate the disadvantages of noise, vibration and poor reading performance caused by the high speed operation of a conventional optical disc drive.

To achieve the above-mentioned object, the present invention provides a method of adjusting the rotation speed of an optical disc drive for a spindle motor controlled by a host to rotate and read an optical disc, comprising the steps of determining if a type of data stored in the optical disc is in Mode 1 or Form 1 of Mode 2, detecting the host outputs a plurality of requests in the frequency lower than a predetermined frequency, determining a plurality of response data responding to the requests are sequential reading data, and rotating the spindle motor to load the optical disc at a predetermined rotation speed.

In addition, the present invention provides a method of adjusting a rotation speed of an optical disc drive, wherein the host outputs the requests if a frequency lower than the predetermined frequency is detected by the time the optical disc drive transmits data through a data bus.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
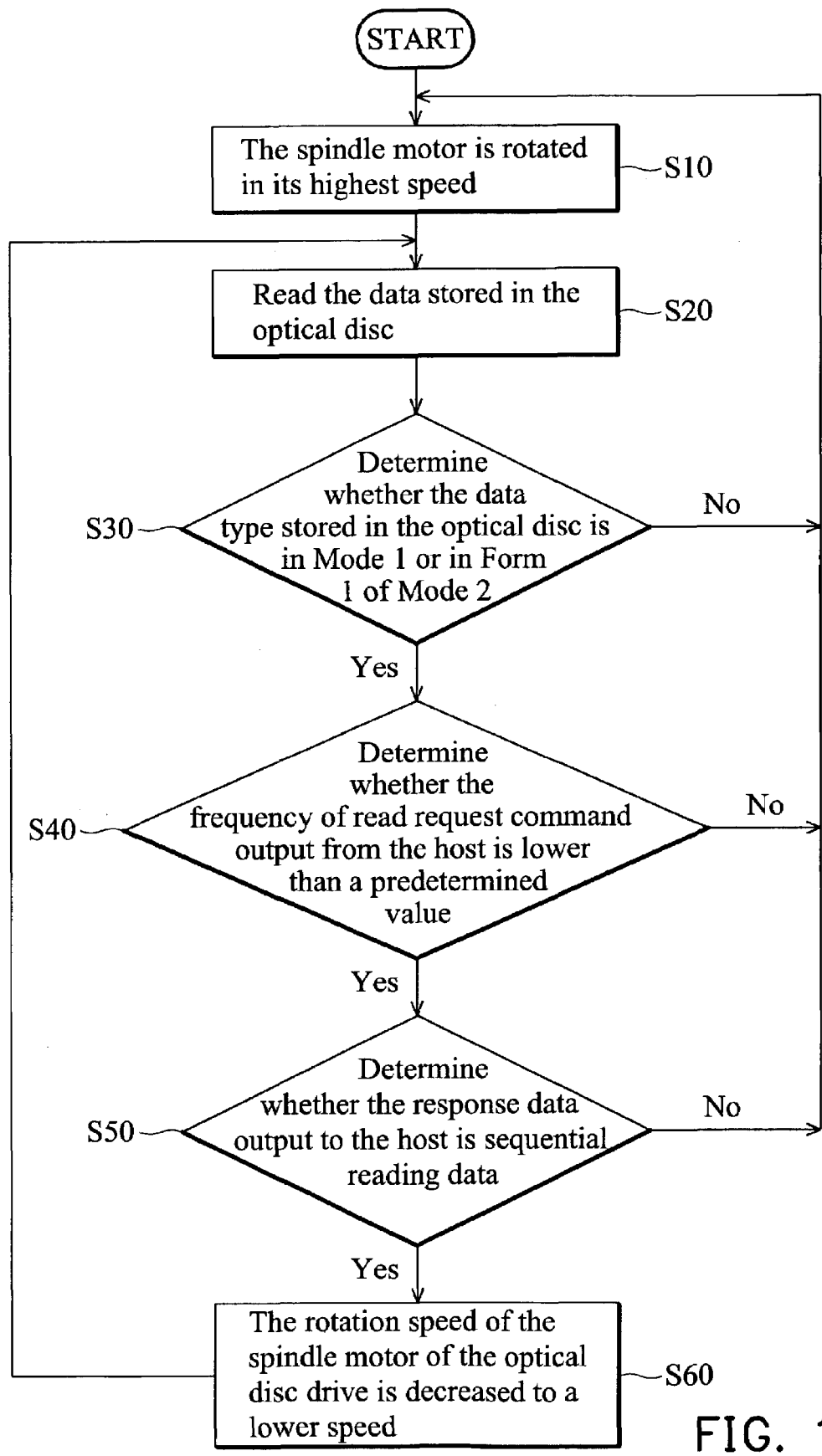
FIG. 1 shows a flowchart of the process for adjusting rotation speed of the optical disc drive according to the embodiment of the present invention.

The present invention provides a method for adjusting the rotation speed of the spindle motor of an optical disc drive loading an optical disc. The optical disc drive reads the data recorded in the optical disc according the request of a host (personal computer). The optical disc drive according to the present invention lowers the rotation speed of the spindle motor when the recorded data type is MP3.

The optical disc drive playing MP3 data is determined according to the following characteristics.

(1) As mentioned above, MP3 data is stored in an optical disc in Mode 1 or Form 1 of Mode 2. The data type of the read data is checked according to Q code of the table of contents (TOC) while the optical disc drive reads the optical disc. Thus, the data type which is not MP3 is ascertained when its type is not Mode 1 or Form 1 of Mode 2.

(2) The frequency of read request commands output from the host is lower than a predetermined value when the host is playing MP3 data. That is, the data bus between the host and the optical disc drive does not reach full capacity. Thus, the frequency of read request commands output from the host is checked by sampling the data flow rate in the data bus. For example, the data bus is sampled each 20 ms over 600 ms. A count value of one is added if the data bus is transmitting data while being sampled. Thus, indicating that the frequency of read request output from the host is too low if the count value is less than 19 four times over the course of 600 ms.

(3) The response data output to the host in responding to the read request commands must be sequential reading data when the host is playing MP3 data. That is, the addresses of the response data are sequential values. The data read by the optical disc drive is ascertained as not being MP3 data when the addresses of the response data are not sequential values.

FIG. 1 shows a flowchart of the process for adjusting rotation speed of the optical disc drive according to the embodiment of the present invention. First, the spindle motor is rotated at its highest speed (S10). Thus, the data stored in the optical disc is read at high speed (S20). Next, it is determined whether the data type stored in the optical disc is in Mode 1 or in Form 1 of Mode 2 (S30). If the data type stored in the optical disc is not in Mode 1 or in Form 1 of Mode 2, the data read by the optical disc drive is ascertained as not being MP3 data. Thus, the spindle motor of the optical disc drive rotates at the highest speed (S10).

If the data type stored in the optical disc is in Mode 1 or in Form 1 of Mode 2, it is determined whether the frequency of read request commands output from the host is lower than a predetermined value or not (S40). According to the present invention, the frequency of read request commands output from the host is checked by sampling the data bus at a predetermined period to sense whether the data bus is transmitting data or not. The data read by the optical disc drive is ascertained as not being MP3 data when the frequency of read request commands output from the host is greater than the predetermined value. Thus, the spindle motor of the optical disc drive rotates at the highest speed to enhance the quantity of data reads (S10).

It is determined whether the response data output to the host is sequential reading or not when the frequency of the read request commands output from the host is lower than the predetermined value (S50). The data read by the optical disc drive is ascertained not MP3 data when the addresses of the response data are not sequential values. Thus, the spindle motor of the optical disc drive rotates at the highest speed to enhance the quantity of data read (S10). Conversely, the data read by the optical disc drive is ascertained as MP3 data when the addresses of the response data are sequential values. Thus, the rotation speed of the spindle motor of the optical disc drive is decreased to a lower speed (S60). In the present embodiment, the lower speed is lower than 5.5M byte/sec (32×).

According to the method for adjusting the rotation speed of the spindle motor of an optical disc drive of the present invention, the data read by the optical disc drive is ascertained as being MP3 data by determining that the data is in Mode 1 or Form 1 of Mode 2 (S30), detecting if the frequency of read request commands output from the host is lower than the predetermined value (S40), and detecting if the response data output to the host is sequential reading data (S50). If the three situations mentioned above are all sustained, the data read by the optical disc drive is determined to be MP3 data. If one of the three situations is not sustained, the optical disc drive rotates at its highest speed to enhance the quantity of data read between the optical disc drive and the host. Thus, the rotation speed of the optical disc drive is adjusted automatically in responding to the data transition rate.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method of adjusting a rotation speed of an optical disc drive for a spindle motor controlled by a host to rotate and read an optical disc, comprising the following steps:
   (a) determining if a type of data stored in the optical disc is in Mode 1 or Form 1 of Mode 2;
   (b) detecting if the host outputs a plurality of requests in the frequency lower than a predetermined frequency;
   (c) determining if a plurality of response data responding to the requests are sequential reading data; and
   (d) rotating the spindle motor loading the optical disc at a predetermined rotation speed only if the determining and detecting steps of (a), (b), and (c) all resolve in the positive.

2. The method of adjusting a rotation speed of an optical disc drive as claimed in claim 1, further comprising a step of rotating the optical disc by the spindle motor at a highest rotation speed of the spindle motor before step (a).

3. The method of adjusting a rotation speed of an optical disc drive as claimed in claim 2, wherein the spindle motor rotates the optical disc at the highest rotation speed when the type of data stored in the optical disc is not in Mode 1 or Form 1 of Mode 2.

4. The method of adjusting a rotation speed of an optical disc drive as claimed in claim 1, wherein the host outputs the requests at a frequency lower than the predetermined frequency, and is detected by the time the optical disc drive transmits data through a data bus.

5. The method of adjusting a rotation speed of an optical disc drive as claimed in claim 2, wherein the spindle motor rotates the optical disc at the highest rotation speed when the host outputs the requests in the frequency not lower than the predetermined frequency.

6. The method of adjusting a rotation speed of an optical disc drive as claimed in claim 1, wherein the predetermined rotation speed is lower than 5.5 M byte/sec (32×).

7. The method of adjusting a rotation speed of an optical disc drive as claimed in claim 1, wherein the addresses of the response data are continuous.

* * * * *